(12) United States Patent
Matsumoto

(10) Patent No.: US 12,384,203 B2
(45) Date of Patent: Aug. 12, 2025

(54) TIRE

(71) Applicant: The Yokohama Rubber Co., LTD., Tokyo (JP)

(72) Inventor: Kenichi Matsumoto, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 464 days.

(21) Appl. No.: 17/757,036

(22) PCT Filed: Dec. 7, 2020

(86) PCT No.: PCT/JP2020/045379
§ 371 (c)(1),
(2) Date: Jun. 8, 2022

(87) PCT Pub. No.: WO2021/117653
PCT Pub. Date: Jun. 17, 2021

(65) Prior Publication Data
US 2022/0410634 A1 Dec. 29, 2022

(30) Foreign Application Priority Data
Dec. 13, 2019 (JP) ................. 2019-225608

(51) Int. Cl.
*B60C 11/12* (2006.01)
*B60C 11/03* (2006.01)

(52) U.S. Cl.
CPC ...... *B60C 11/1272* (2013.01); *B60C 11/0304* (2013.01); *B60C 11/1236* (2013.01);
(Continued)

(58) Field of Classification Search
CPC ............. B60C 11/1263; B60C 11/0304; B60C 11/1236; B60C 2011/1295; B60C 2011/0348
See application file for complete search history.

(56) References Cited

U.S. PATENT DOCUMENTS 2,272,879 A * 2/1942 Hargraves ........... B60C 11/1263
D12/598
2012/0118455 A1 5/2012 Hada
(Continued)

FOREIGN PATENT DOCUMENTS

| EP | 2505387 A1 | 10/2012 |
| EP | 3208111 A1 | 8/2017 |

(Continued)

OTHER PUBLICATIONS

Machine translation for Japan 2007-168628 (Year: 2024).*
Machine translation for Japan 61-159203 (Year: 2024).*
Partial translation for Japan 61-159203 (Year: 2024).*

*Primary Examiner* — Steven D Maki
(74) *Attorney, Agent, or Firm* — Thorpe North & Western

(57) ABSTRACT

A tire tread includes a pair of first circumferential main grooves in a first half-tread region on one side in a tire width direction, a pair of second circumferential main grooves in a second half-tread region, first sipes provided in a first region between the first circumferential main grooves, a circumferential narrow groove having a groove width smaller than a groove width of the first circumferential main groove and extending in the tire circumferential direction within the first region, and sipes in a second region between the second circumferential main grooves, extending in the tire width direction, and closing within the second region. The number of intervals of the second sipes mutually adjacent is larger than the number of intervals of the first sipes mutually adjacent.

14 Claims, 5 Drawing Sheets

(52) U.S. Cl.
CPC ... *B60C 11/1263* (2013.01); *B60C 2011/0348* (2013.01); *B60C 2011/1295* (2013.01)

(56) References Cited

U.S. PATENT DOCUMENTS

| | | |
|---|---|---|
| 2012/0247632 A1 | 10/2012 | Hayashi |
| 2017/0210175 A1 | 7/2017 | Yoshimura |
| 2019/0283505 A1* | 9/2019 | Kuriyama ............... B60C 11/00 |
| 2019/0366774 A1 | 12/2019 | Tanabe et al. |
| 2019/0375246 A1* | 12/2019 | Kubo ................. B60C 11/1236 |
| 2020/0148008 A1* | 5/2020 | Nemoto ................. B60C 11/24 |

FOREIGN PATENT DOCUMENTS

| | | |
|---|---|---|
| EP | 3575111 A1 | 12/2019 |
| JP | 61-159203 U * | 10/1986 |
| JP | 2007-168628 A * | 7/2007 |
| JP | 2012-228992 A | 11/2012 |
| JP | 2014-76764 A | 5/2014 |
| JP | 2017-81540 A | 5/2017 |
| JP | 2017-226369 A | 12/2017 |
| JP | 2019-43541 A | 3/2019 |
| JP | 2019-182202 A | 10/2019 |
| JP | 2019-209731 A | 12/2019 |
| JP | 2019-209874 A | 12/2019 |
| WO | WO-2018-235400 A1 * | 12/2018 |

* cited by examiner

TIRE

TECHNICAL FIELD

The present technology relates to a tire having a tread pattern in a tread portion.

BACKGROUND ART

One known way to improve the wet performance of a tire is to provide, on a tread surface of the tire, a main groove extending in a tire circumferential direction and also a lug groove extending in a tire width direction for ensuring drainage properties. However, in a configuration in which the lug groove has a large groove volume, a loud popping sound is generated when kicking out, and performance to reduce tire noise (hereinafter referred to as noise performance) is degraded.

In the related art, there is known a tire without a groove having a width of 2 mm or more provided in a crown land portion or a middle land portion in a tread portion (see Japan Unexamined Patent Publication No. 2017-226369).

In a configuration of Japan Unexamined Patent Publication No. 2017-226369, to avoid degrading noise performance, a groove having a width of 2 mm or more is not provided in a crown land portion or a middle land portion on a tread surface including a main groove and a lug groove, groove volume decreases, and thus noise performance improves, but drainage properties cannot be ensured due to a decrease in the groove volume, degrading wet performance.

SUMMARY

The present technology provides a tire that provides improved wet performance while suppressing degradation of noise performance.

An aspect of the present technology is a tire including a tread pattern in a tread portion.

The tread pattern includes: a pair of first circumferential main grooves provided in a first half-tread region on one side of a tire centerline in a tire width direction, extending in a tire circumferential direction, and disposed at intervals from each other in the tire width direction; a pair of second circumferential main grooves provided in a second half-tread region on an other side in the tire width direction, extending in the tire circumferential direction, and disposed at intervals from each other in the tire width direction; a plurality of first sipes provided in a first region between the first circumferential main grooves, communicating with one of the first circumferential main grooves, extending in the tire width direction, and closing within the first region; a circumferential narrow groove having a groove width smaller than a groove width of the first circumferential main groove and extending in the tire circumferential direction within the first region; and a plurality of second sipes provided in a second region between the second circumferential main grooves, communicating with one or an other of the second circumferential main grooves, extending in the tire width direction, and closing within the second region. The number of intervals of the second sipes adjacent in the tire circumferential direction is larger than the number of intervals of the first sipes adjacent in the tire circumferential direction.

Preferably, the tread pattern does not include lug grooves that are provided in the first region, communicate with the first circumferential main groove, and extend in the tire width direction, or lug grooves that are provided in the second region, communicate with the second circumferential main groove, and extend in the tire width direction.

Preferably, the second sipes include a second sipe A and a second sipe B, the second sipe A communicating with one of the second circumferential main grooves and the second sipe B communicating with the other of the second circumferential main grooves at a location, in the tire circumferential direction, which is different from a location, in the tire circumferential direction, where the second sipe A communicates with the circumferential main groove.

Preferably, a plurality of the second sipes A and a plurality of the second sipes B are disposed at intervals in the tire circumferential direction, and the second sipes B are disposed one by one between the second sipes A adjacent in the tire circumferential direction.

Preferably, a direction connecting two ends of an extension direction of the second sipe A and a direction connecting two ends of an extension direction of the second sipe B are inclined, with respect to the tire width direction, to a same side in the tire circumferential direction.

Preferably, lengths of the intervals of the second sipes differ between the intervals adjacent in the tire circumferential direction.

Preferably, the first sipe communicates with the circumferential narrow groove.

Preferably, a sipe depth of a narrow groove side connection portion of the first sipe is smaller than a groove depth of the circumferential narrow groove, the narrow groove side connection portion connecting to the circumferential narrow groove, and a sipe depth of an intermediate portion of the first sipe is deeper than the groove depth of the circumferential narrow groove, the intermediate portion being located between the first circumferential main groove, with which the first sipe communicates, and the narrow groove side connection portion.

Preferably, a sipe depth of a main groove side communicating portion of the first sipe is smaller than a groove depth of the circumferential main groove, the main groove side communicating portion communicating with the first circumferential main groove.

Preferably, the first sipe extends in a curved shape bulging to one side in the tire circumferential direction on a tread surface.

Preferably, a length of the first sipe in an extension direction of the first sipe is greater than a length of the second sipe in an extension direction of the second sipe.

Preferably, the second sipe extends in a straight line, and an inclination angle, with respect to the tire width direction, of a direction connecting two ends of an extension direction of the second sipe differs between the second sipes adjacent in the tire circumferential direction.

Preferably, the tread pattern comprises a plurality of third sipes that are provided in a third region between the first circumferential main groove, of the first circumferential main grooves, closest to the tire centerline and the second circumferential main groove, of the second circumferential main grooves, closest to the tire centerline, communicate with either the first circumferential main groove or the second circumferential main groove, extend in the tire width direction, and close within the third region, and the number of the intervals of the second sipes is larger than a number of intervals of the third sipes adjacent in the tire circumferential direction.

Preferably, a length of the second sipe in the tire width direction is half or less of a length of the second region in the tire width direction, and a length of the third sipe in the tire width direction is half or less of a length of the third region in the tire width direction.

Preferably, the tread pattern has a vehicle mounting orientation designated such that the second half-tread region is disposed in a vehicle outer side of the first half-tread region.

The tire of the aspect described above can suppress degradation of wet performance while improving noise performance.

DETAILED DESCRIPTION

Overall Description of Tire

Hereinafter, afire of the present embodiment is described. The tire of the present technology is preferably a pneumatic tire, and the tire of the present embodiment is a pneumatic tire. A pneumatic tire is a tire including a cavity region surrounded by a tire and a rim, the cavity region being filled with air. Note that in the tire of the present embodiment, the cavity region surrounded by a tire and a rim may be filled with an inert gas such as nitrogen or other gas instead of air. The present embodiment includes various embodiments described below.

Figure 1:
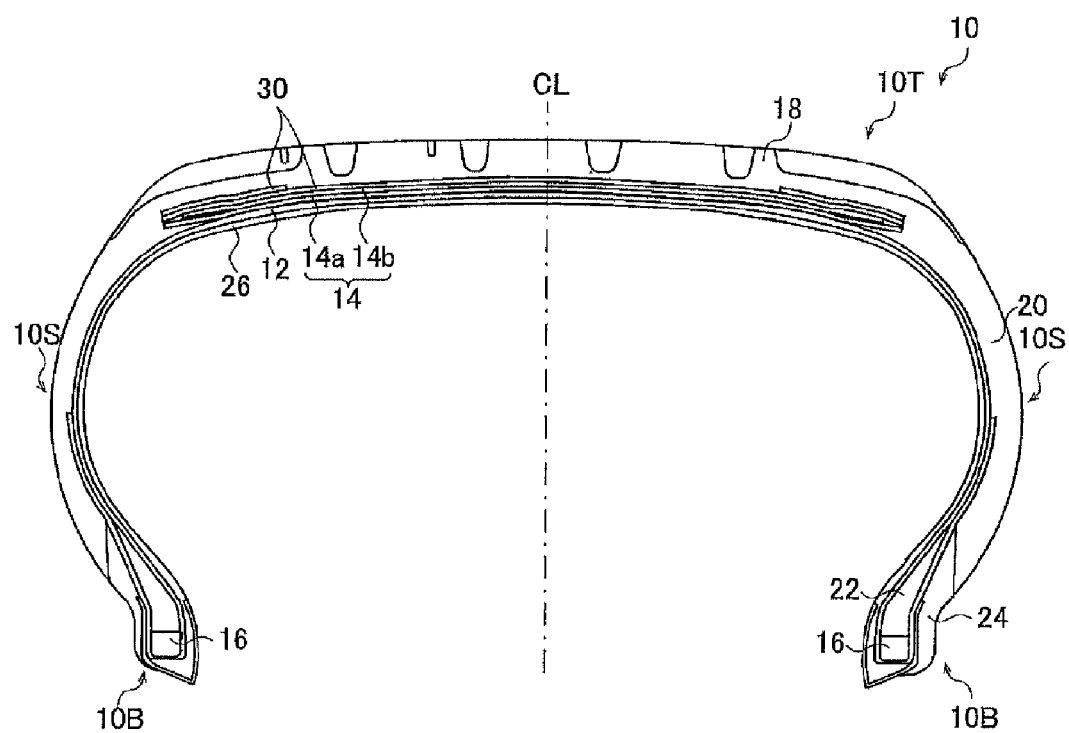
FIG. 1 is a diagram illustrating an example of a profile cross-section of a pneumatic tire according to the present embodiment.

FIG. 1 is a tire cross-sectional view illustrating an example of a profile cross-section of a pneumatic tire (hereinafter referred to simply as "tire") 10.

The tire 10 is, for example, a tire for a passenger vehicle. "Tire for a passenger vehicle" refers to a tire specified in Chapter A of the JATMA YEAR BOOK 2012 (standards of The Japan Automobile Tyre Manufacturers Association, Inc.). The tire 10 can also be applied to a tire for a light truck specified in Chapter B and a tire for a truck and a bus specified in Chapter C.

Tire width direction is a direction parallel to a rotation axis of a tire. "Outer side in the tire width direction" is a side distant from a tire centerline CL (tire equator line) representing a tire equatorial plane in the tire width direction. Additionally, "inner side in the tire width direction" is a side closer to the tire centerline CL in the tire width direction. Tire circumferential direction is a direction of rotation about the rotation axis of a tire. "Tire radial direction" is a direction orthogonal to the rotation axis of a tire. "Outer side in the tire radial direction" refers to a side away from the rotation axis. Similarly, "inner side in the tire radial direction" refers to a side closer to the rotation axis.

Tire Structure

The tire 10 includes a tread portion 10T including a tread pattern, a pair of bead portions 10B, and a pair of side portions 10S provided in two sides of the tread portion 10T and connected to the pair of bead portions 10B and the tread portion 10T.

The tire 10 includes a carcass ply 12, a belt 14, and a bead core 16 as framework members and mainly includes, around the framework members, a tread rubber member 18, a side rubber member 20, bead filler rubber members 22, rim cushion rubber members 24, and an innerliner rubber member 26.

The carcass ply 12 is formed of a carcass ply member that is made of organic fibers covered with rubber and wound between a pair of the bead cores 16 having an annular shape into a toroidal shape. The carcass ply 12 is wound around the bead cores 16 and extends to an outer side in the tire radial direction. The belt 14 is provided in an outer side of the carcass ply 12 in the tire radial direction and includes two belt members 14a, 14b. The belt 14 includes a member made of a steel cord that is covered with rubber and inclined at a predetermined angle, for example, at from 20 to 30 degrees, with respect to the tire circumferential direction. The belt member 14a of an inner layer has a width in the tire width direction that is greater than a width in the tire width direction of the belt member 14b of an outer layer. The steel cords of the two belt members 14a, 14b are inclined in opposite directions. As such, the belt members 14a, 14h are crossing layers serving to suppress expansion of the carcass ply 12 due to pressure of the air in the tire.

The tread rubber member 18 is provided in an outer side of the belt 14 in the tire radial direction. The side rubber members 20 are connected to two end portions of the tread rubber member 18 and form the side portions 10S. The rim cushion rubber members 24 are provided at ends in an inner side of the side rubber member 20 in the tire radial direction and come into contact with a rim on which the tire 10 is mountable. Each of the bead filler rubber members 22 is provided in an outer side of each of the head cores 16 in the tire radial direction and is interposed between a portion of the carcass layer 12 prior to being wound around the bead core 16 and a portion of the carcass ply 12 wound around the bead core 16. The innerliner rubber member 26 is provided on an inner surface of the tire 10 facing a tire cavity region that is filled with air and is surrounded by the tire 10 and the rim.

Additionally, two belt covers 30 made of organic fiber covered with rubber are provided between the belt member 14b and the tread rubber member 18. The two belt covers 30 cover the belt 14 from the outer side of the belt 14 in the tire radial direction.

Tread Pattern

Figure 2:
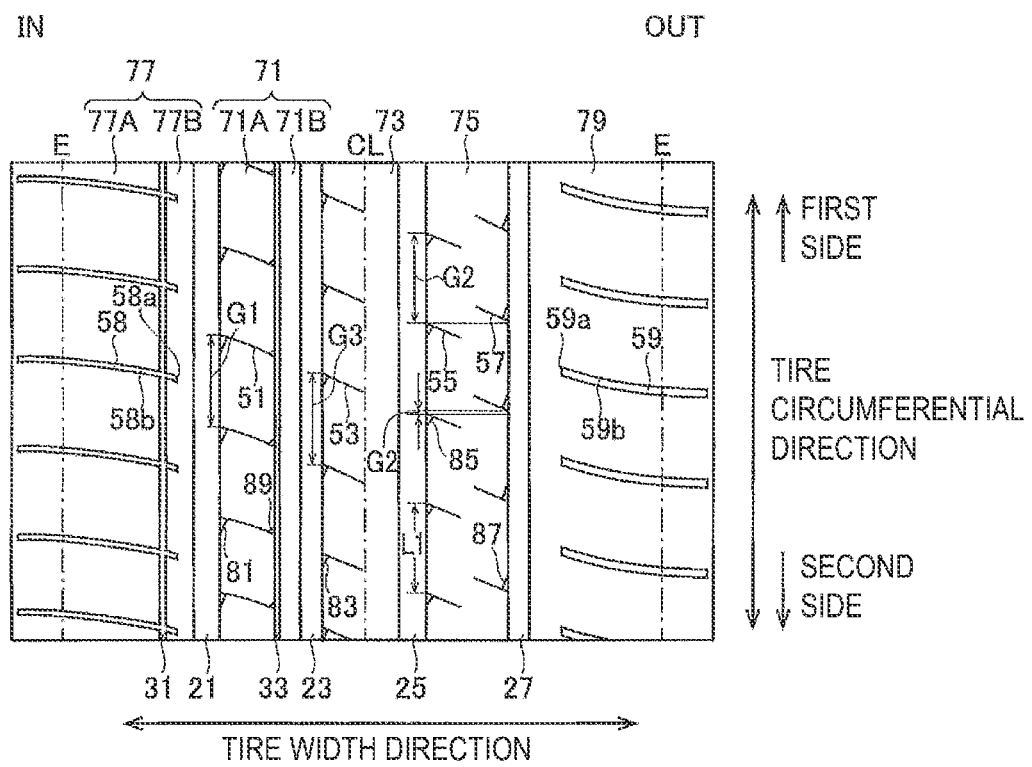
FIG. 2 is a diagram illustrating an example of a tread pattern of the tire of FIG. 1.

FIG. 2 is a diagram illustrating a portion developed into a plan view of an example of a tread pattern of the tire 10 of FIG. 1.

The tread pattern according to the example illustrated in FIG. 2 includes a first outer main groove 21, a first inner main groove 23, a second inner main groove 25, and a second outer main groove 27 as circumferential main grooves extending in the tire circumferential direction.

The first outer main groove 21 and the first inner main groove 23 are provided in a first half-tread region on one side (left side in FIG. 2) of the tire centerline CL in the tire width direction and are disposed at intervals from each other in the tire width direction.

The second inner main groove 25 and the second outer main groove 27 are provided in a second half-tread region on the other side (right side in FIG. 2) in the tire width direction and are disposed at intervals from each other in the tire width direction.

Herein, main groove means a groove having a groove depth of, for example, from 6.5 to 9.0 mm and a groove width of, for example, from 5.0 to 15.0 mm.

The number of main grooves provided in the tread pattern is four in the example illustrated in FIG. 2, but may be, for example, three or five. In a configuration including three main grooves, the first inner main groove 23 and the second inner main groove 25 are, in the example illustrated in FIG. 2, substituted by one circumferential main groove passing over the tire centerline CL.

The tread pattern according to the example illustrated in FIG. 2 further includes narrow grooves 31, 33 as two circumferential narrow grooves extending in the tire circumferential direction. The narrow grooves 31, 33 each have a smaller groove width than the main grooves 21, 23, 25, 27. The narrow grooves 31, 33 each have a smaller groove depth than the main grooves 21, 23, 25, 27. The groove depths of the narrow grooves 31, 33 are, for example, from 1.0 to 5.0 mm and the groove widths of the narrow grooves 31, 33 are, for example, from 0.8 to 3.0 mm.

The narrow groove 31 is provided in a shoulder region 77 of the tread pattern on an outer side of the first outer main groove 21 in the tire width direction.

The narrow groove 33 is provided in a first middle region (first region) 71 between the first outer main groove 21 and the first inner main groove 23. The narrow groove 33 is located, within the first middle region 71, on a first inner main groove 23 side of the center in the tire width direction of the first middle region 71.

According to an embodiment, the circumferential narrow groove is preferably not provided in a second middle region 75 and a center region 73, which are described below. In the tread pattern according to the example illustrated in FIG. 2, the circumferential narrow groove is not provided in a shoulder region 79, which is described below.

The tread pattern according to the example illustrated in FIG. 2 further includes first sipes 51, second sipes 55, 57, and third sipes 53. The first sipes 51, the second sipes 55, 57, and the third sipes 53 ensure edge components extending in the tire width direction, thus improving an edge effect against a force in a front-rear direction (direction parallel to the tire circumferential direction on a ground contact surface). Herein, sipe refers to a sipe having a sipe depth of, for example, from 2.0 to 7.5 mm and a sipe width of, for example, from 0.3 to 1.0 mm.

A plurality of the first sipes 51 are provided at intervals in the tire circumferential direction in the first middle region 71, communicate with the first outer main groove 21, extend in the tire width direction, and close within the first middle region 71. According to an embodiment, the first sipes 51 may communicate with the first inner main groove 23 instead of with the first outer main groove 21.

A plurality of the second sipes 55 (second sipes A) are provided at intervals in the tire circumferential direction in the second middle region 75 between the second inner main groove 25 and the second outer main groove 27, communicate with the second inner main groove 25, extend in the tire width direction, and close within the second middle region 75.

A plurality of the second sipes 57 (second sipes B) are provided at intervals in the tire circumferential direction in the second middle region 75, communicate with the second outer main groove 27, extend in the tire width direction in the second middle region 75, and close within the second middle region 75 without reaching the second inner main groove 25.

According to an embodiment, the second middle region 75 may include only either the second sipes 55 or the second sipes 57.

A plurality of the third sipes 53 are provided at intervals in the tire circumferential direction in the center region (third region) 73 between the first inner main groove 23 and the second inner main groove 25, communicate with the first inner main groove 23, extend in the tire width direction, and close within the center region 73. According to an embodiment, the third sipes 53 may communicate with the second inner main groove 25 instead of with the first inner main groove 23.

In the present embodiment, the number of intervals G2 of the second sipes 55, 57 adjacent in the tire circumferential direction (hereinafter referred to as the interval G2 of the second sipes 55, 57) is larger than the number of intervals G1 of the first sipes 51 adjacent in the tire circumferential direction (hereinafter referred to as the interval G1 of the first sipes 51). The intervals of the sipes adjacent in the tire circumferential direction refers to intervals of positions where lines extending the sipes along the shape of the sipes extending on the tread surface intersect the groove wall of the main groove in communication with the sipes (hereinafter the communicating positions), the positions being adjacent in the tire circumferential direction. Two adjacent communicating positions may be located in the same main groove or in different main grooves. Thus, the intervals between second middle sipes having the communicating positions at the same positions in the tire circumferential direction in the region are not included in the "intervals of the sipes adjacent in the tire circumferential direction".

In the present embodiment, the first middle region 71 and the second middle region 75 include the sipes 51, 55, 57, and this reduces groove volume and improves noise performance, compared to a configuration in which the same include lug grooves instead of the sipes 51, 55, 57. On the other hand, the first middle region 71 including the narrow grooves 33 compensates for degradation of drainage properties, which is caused by the inclusion of the sipes 51 instead of the lug grooves, and suppresses degradation of steering stability on wet road surfaces (wet performance). Additionally, in the second middle region 75, as described above, the number of intervals G2 of the second sipes 55, 57 is larger than the number of intervals G1 of the first sipes 51, and this reduces the rigidity of the land portion of the second middle region 75 and makes the same easily deformable and more likely to follow road surface. Thus, in the second middle region 75, adhesion friction with road surface is large, and the effect of suppressing degradation of wet performance increases. That is, compared to a configuration including lug grooves in place of the sipes 51, 55, 57, the present embodiment suppresses degradation of wet performance while improving noise performance. In the present embodiment, the two middle regions 71, 75 differ in shape and exhibit different functions with respect to wet performance, and this yields the effect of suppressing degradation in wet performance. Thus, in the present embodiment, the tread pattern is asymmetric with respect to the tire centerline CL.

Here, in a configuration in which the number of intervals G2 of the second sipes 55, 57 is equal to the number of intervals G1 of the first sipes 51, or is less than the number of intervals G1 of the first sipes 51, the rigidity of the second middle region 75 is too high, the land portion is not easily deformed, and followability to road surface is not high. Thus, a force to grip road surface by variation in the force received from road surface is insufficient. According to an embodiment, the number of intervals G2 of the second sipes 55, 57 is preferably from 1.5 to 2.5 times the number of intervals G1 of the first sipes 51, and more preferably from 1.8 to 2.2 times. Further, according to an embodiment, the average of the intervals G2 of the second sipes 55, 57 in the second middle region 75 is preferably smaller than the average of the intervals G1 of the first sipe 51 in the first middle region 71.

The tread pattern according to the example illustrated in FIG. 2 further includes shoulder lug grooves 58, 59.

A plurality of the lug grooves 58 are disposed at intervals in the tire circumferential direction in the shoulder region 77 on an outer side in the tire width direction of the first outer main groove 21, extend in the tire width direction from the outer side in the tire width direction toward the first outer main groove 21 within an outer region 77A, in the shoulder region 77, located on an outer side of the narrow groove 31 in the tire width direction, intersect the narrow groove 31, and close within an inner region 77B between the narrow groove 31 and the main groove 21 without reaching the first outer main groove 21.

A plurality of the lug grooves 59 are disposed at intervals in the tire circumferential direction in a shoulder region 79 on an outer side in the tire width direction of the second outer main groove 27, extend in the tire width direction from the outer side in the tire width direction toward the main groove 27 within the shoulder region 79, and close within the region 79 without reaching the main groove 27.

Note that the regions 77B. 79 include ground contact edges E in the tire width direction. "Ground contact edges" refer to two ends in the tire width direction of a ground contact surface where the tire 10 mounted on a regular rim, inflated to a regular internal pressure, and loaded with 88% of a regular load is brought into contact with a horizontal surface. "Regular rim" refers to a "measurement rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, a maximum value in "TIRE LOAD LIMITS AT VARIOUS COLD INFLATION PRESSURES" defined by TRA, or a "LOAD CAPACITY" defined by ETRTO.

The shoulder lug grooves 58, 59 include closed ends 58a, 59a of the shoulder lug grooves 58, 59, and main groove side portions 58b, 59b, which are located on an outer main groove 21 side and an outer main groove 27 side, respectively, of the ground contact edges E, extend at an incline with respect to the tire width direction.

According to an embodiment, the tread pattern preferably does not include lug grooves in the first middle region 71 that communicate with at least one of the first outer main groove 21 and the first inner main groove 23 and extend in the tire width direction, or lug grooves in the second middle region 75 that communicate with at least one of the second outer main groove 27 and the second inner main groove 25 and extend in the tire width direction. Accordingly, groove volume decreases and tire noise performance improves. According to a further embodiment, the tread pattern preferably does not include lug grooves in the center region 73 that communicate with at least one of the first inner main groove 23 and the second inner main groove 25 and extend in the tire width direction. Lug groove is a groove having a component extending in the tire width direction and having a groove width of 1.5 mm or more.

According to an embodiment, the second sipes preferably include, as in the example illustrated in FIG. 2, the second sipes 55 (second sipes A) communicating with the second inner main groove 25 and the second sipes 57 (second sipes B) having communicating positions with the second outer main groove 27 in the tire circumferential direction that are different from communicating positions between the second sipes 55 and the second inner main groove 25. Thus, in a configuration in which the second middle region 75 includes both the sipes communicating with the second inner main groove 25 and the sipes communicating with the second outer main groove 27, the balance of the rigidity of the land portion in the second middle region 75 in the tire width direction improves, and the land portion can easily follow various changes in the force received from road surface. The percentage of the number of second sipes 55 and second sipes 57 to the total number of second sipes is preferably from 20 to 80%, and is more preferably from 30 to 70%.

In this embodiment, according to a further embodiment, the second sipes 57 are disposed one by one between the second sipes 55 adjacent in the tire circumferential direction. Accordingly, the balance of the rigidity in the tire width direction of the land portion of the second middle region 75 particularly improves. The percentages described above are preferably 50% each.

In an embodiment in which a length L1 is a length along the tire circumferential direction between two communicating positions at which two second sipes 55 adjacent in the tire circumferential direction each communicate with the second inner main groove 25, the communicating positions of the second sipes 57 with the second outer main groove 27, as illustrated in FIG. 2, are preferably within the range of from 50 to 97% of the length L1 from one of the two communicating positions (first side in FIG. 2), and more preferably within the range of from 70 to 95% thereof. This increases an effect of reducing tire noise. Note that the one of the two communicating positions refers to a communicating position of the second sipe 55 with the second inner main groove 25, the second sipe 55 including a closed end within the range in the tire circumferential direction between the two communicating positions.

In these embodiments, according to a further embodiment, the direction connecting two ends of the second sipe 55 in the extension direction thereof and the direction connecting two ends of the second sipe 57 in the extension direction thereof are preferably inclined, as a direction from one end to the other in the tire width direction, toward the same side in the tire circumferential direction with respect to the tire width direction. This can suppress, in the second middle region 75, concentration of locations where the rigidity of the land portion is low. In the example illustrated in FIG. 2, the two directions are inclined to a first side (upper side in FIG. 2) in the tire circumferential direction with respect to the tire width direction. According to a further embodiment, the first sipe 51 and the second sipes 55, 57 preferably have the relationship, described above, of being inclined to the same side, and more preferably the first sipe 51, the third sipe 53, and the second sipes 55, 57 have the relationship, described above, of being inclined to the same side.

According to an embodiment, the lengths of the intervals G2 of the second sipes 55, 57 are preferably different between the intervals adjacent in the tire circumferential direction. FIG. 2 illustrates a plurality of the intervals G2 having different lengths. This yields the effect of dispersing the frequency of pattern noise, contributing to improving noise performance.

According to an embodiment, the first sipes 51 are preferably connected to the narrow groove 33. This increases the drainage properties in the first middle region 71.

Figure 3:
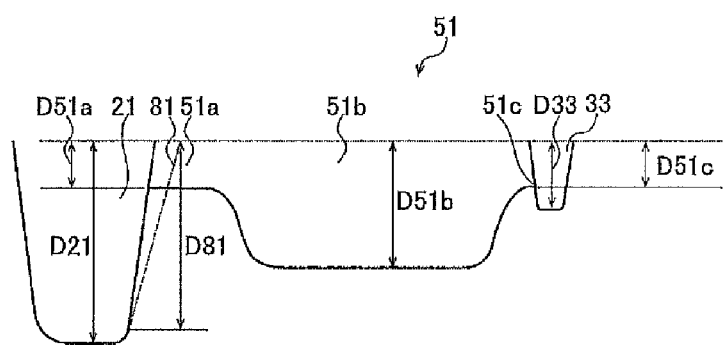
FIG. 3 is a diagram illustrating a cross-section of a portion of a first middle region.

In this embodiment, according to a further embodiment, as illustrated in FIG. 3, a sipe depth $D51c$ of a narrow groove side connection portion 51c of the first sipe 51, the narrow groove side connection portion connecting to the narrow groove 33, is smaller than a groove depth $D33$ of the narrow groove 33, and a sipe depth $D51b$ of an intermediate portion 51b of the first sipe 51, the intermediate portion being located between the first outer main groove 21, which communicate with the first sipe 51, and the narrow groove side connection portion 51c, is greater than the groove depth $D33$ of the narrow groove 33. The narrow groove side connection portion 51c having a such raised bottom portion can suppress a decrease in rigidity at the connection position of the first sipe 51 with the narrow groove 33. Further, the intermediate portion 51b of the first sipe 51 is deeper than the narrow groove 33, and this improves the water absorbency of the first sipe 51 and contributes to improving wet performance. FIG. 3 is a diagram illustrating a cross-section of a region, in the tire width direction, of the first middle region 71, which is along the extension direction of the first sipe 51. FIG. 3 omits a third chamfered surface, which is described below.

In these two embodiments, according to a further embodiment, a sipe depth $D51a$ of a main groove side communicating portion 51a, of the first sipe 51, the main groove side communicating portion communicating with the first outer main groove 21, is preferably smaller than the groove depth $D33$ of the narrow groove 33. The main groove side communicating portion 51a having such a raised bottom portion can suppress a decrease in the rigidity in the communicating position of the first sipe 51 with the first outer main groove 21.

According to an embodiment, the sipe depth $D51c$ of the narrow groove side connection portion 51c and the sipe depth $D51a$ of the main groove side communicating portion 51a are preferably from 20 to 50% of the sipe depth $D51b$ of the intermediate portion Sib, and more preferably from 30 to 40% thereof.

According to an embodiment, a groove depth $D21$ of the first outer main groove 21, the sipe depth $D51b$ of the intermediate portion 51b, the groove depth $D33$ of the narrow groove 33, and the sipe depths $D51c$, $D51a$ of the narrow groove side connection portion 51c and the main groove side communicating portion 51a preferably become smaller in this order. That is, $D21>D51b>D33>D51c, D51a$ is preferable. $D51c$ and $D51a$ may be different from each other, but are preferably equal.

According to an embodiment, the first sipe 51 preferably extends in a curved shape so as to bulge roundly to one side in the tire circumferential direction in the tread surface. This suppresses movement, in the first middle region 71, of portions on two sides of the first sipe 51 in the tire circumferential direction to be displaced from each other in the tire width direction when a lateral force is applied, and this contributes to improving wet performance. In the example illustrated in FIG. 2, the first sipe 51 extends so as to form an arc shape that bulges, on the tread surface, to a first side in the tire circumferential direction. The radius of curvature of the arc shape of the first sipe 51 is preferably from 50 to 150 mm.

On the other hand, according to an embodiment, the second sipes 55, 57 and the third sipes 53 preferably extend in a straight line on the tread surface.

In this case, according to a further embodiment, the length of the first sipe 51 in the extension direction thereof is preferably greater than the lengths of the second sipes 55, 57 in the extension directions thereof. The number of first sipes 51 is smaller than the total number of second sipes 55, 57, and such an embodiment contributes to improving the balance of the rigidity of the first middle region 71 and the second middle region 75. Also, this facilitates adjustment of the rigidity of the first middle region 71 to a level between the rigidity of the second middle region 75 and that of the center region 73. Note that, according to an embodiment, the length of the first sipe 51 in the extension direction thereof is preferably greater than the length of the third sipe 53 in the extension direction thereof (for example, from 115 to 125% of the length of the third sipe 53 in the extension direction thereof).

According to an embodiment, the second sipes 55, 57 each extend in a straight line, and the inclination angle, with respect to the tire width direction, of the direction connecting two ends of the extension direction of the second sipe 55 is preferably different between the second sipes 55 adjacent in the tire circumferential direction and the inclination angle, with respect to the tire width direction, of the direction connecting two ends of the extension direction of the second sipe 57 is preferably different between the second sipes 57 adjacent in the tire circumferential direction.

According to an embodiment, the number of intervals G2 of the second sipes 55 and the number of intervals G2 of the second sipes 57 is preferably larger than the number of intervals G3 of the third sipes 53 adjacent in the tire circumferential direction (hereinafter referred to as the intervals G3 of the third sipes 53). That is, the number of intervals G3 of the third sipes 53 is preferably smaller than the number of intervals G2 of the second sipes 55, 57. The center region 73 has, in the tread portion, the longest ground contact length in the tire circumferential direction, and thus a ground contact area with the road surface is preferably ensured according to the embodiment described above. According to an embodiment, the number of intervals G2 of the second sipes 55, 57 is preferably from 1.5 to 2.5 times the number of intervals G3 of the third sipes 53, and more preferably from 1.8 to 2.2 times the number of same.

In this case, according to a further embodiment, the length of the second sipe 55 and the length of the second sipe 57 in the tire width direction are preferably from 20 to 50% of the length of the second middle region 75 in the tire width direction, and more preferably from 30 to 40% of the same, and the length of the third sipe 53 in the tire width direction is from 20 to 50% of the length of the center region 73 in the tire width direction, and more preferably from 30 to 40% of the same. This can suppress an excessive decrease in the rigidity of the second middle region 75 and of the center region 73.

According to an embodiment, the tread pattern preferably has a vehicle mounting orientation designated such that the second half-tread region is disposed on a vehicle outer side ("out" side illustrated in FIG. 2) of the first half-tread region. In an embodiment in which the second half-tread region, which has a smaller groove area ratio than the first half-tread region, is disposed on the vehicle outer side, noise performance improves.

Chamfered Surface

According to an embodiment, the tread pattern preferably includes any one of a first chamfered surface 81, second chamfered surfaces 85, 87, and a third chamfered surface 83, which correspond to the first sipe 51, the second sipes 55, 57, and the third sipe 53, respectively.

An end portion in the tire width direction of the first sipe 51, which communicates with the first outer main groove 21, is adjacent in the tire circumferential direction to portions of a land portion. The first chamfered surface 81 is a surface having a tread surface of one of the portions of the land portion inclined toward the first outer main groove 21. A plurality of the first chamfered surfaces 81 are provided in the tire circumferential direction, and the first sipes 51 open thereto without reaching the groove wall of the first outer main groove 21.

An end portion in the tire width direction of the second sipe 55, which communicates with the second inner main groove 25, is adjacent in the tire circumferential direction to portions of a land portion. The second chamfered surface 85 is a surface having a tread surface of one of the portions of the land portion inclined toward the second inner main groove 25. A plurality of the second chamfered surfaces 85 are provided in the tire circumferential direction, and the second sipes 55 open thereto without reaching the groove wall of the second inner main groove 25.

An end portion in the tire width direction of the second sipe 57, which communicates with the second outer main groove 27, is adjacent in the tire circumferential direction to portions of a land portion. The second chamfered surface 87 is a surface having a tread surface of one of the portions of the land portion inclined toward the second outer main groove 27. A plurality of the second chamfered surfaces 87 are provided in the tire circumferential direction, and the second sipes 57 open thereto without reaching the groove wall of the second outer main groove 27.

An end portion in the tire width direction of the third sipe 53, which communicates with the first inner main groove 23, is adjacent in the tire circumferential direction to portions of a land portion. The third chamfered surface 83 is a surface having a tread surface of one of the portions of the land portion inclined toward the first inner main groove 23. A plurality of the third chamfered surfaces 83 are provided in the tire circumferential direction, and the third sipes 53 open thereto without reaching the groove wall of the first inner main groove 23.

According to an embodiment, the chamfered surfaces 81, 83, 85, 87 are preferably greater in length in the tire circumferential direction than in the tire width direction. This embodiment includes the sipes 51, 53, 55, 57 in the first middle region 71, the center region 73, and the second middle region 75 and thus has a smaller groove volume and a more excellent noise performance than a configuration including lug grooves instead of the sipes 51, 53, 55, 57. On the other hand, the embodiment includes any one of the chamfered surfaces 81, 83, 85, 87 in the first middle region 71, the center region 73, and the second middle region 75, and thus has more edge components and a larger edge effect than a configuration not including the chamfered surface. This suppresses a decrease in wet performance due to a decrease in drainage properties, with the sipes 51, 53, 55, 57 provided instead of the lug grooves. Further, as described above, the sipes 51, 53, 55, 57 provided ensure edge components that exert an effect on the force in the front-rear direction (tire circumferential direction), and thus with the length in the tire circumferential direction of each of the chamfered surfaces 81, 83, 85, 87 being longer than the length in the tire width direction thereof, edge components that exhibit an effect on a force in a front-rear direction can be ensured, edge components that exhibit an effect on a lateral force can also be ensured, and the effect of improving wet performance with respect to the forces, in various directions, received from the road surface can be obtained.

This increases the effect of suppressing a decrease in wet performance. That is, this embodiment, compared to an embodiment including the lug grooves instead of the sipes 51, 53, 55, 57, suppresses a decrease in wet performance while improving noise performance. Note that this embodiment, which includes at least one of the chamfered surfaces 81, 83, 85, 87 in the first middle region 71, the center region 73, and the second middle region 75, has a larger groove volume than an embodiment without the chamfered surfaces, and makes less of a difference in the groove volume and has less of an effect on noise performance than, for example, an embodiment including notches (the Length in the extension direction is relatively short).

According to an embodiment, the sipes 51, 53, 55, 57 open to the chamfered surfaces 81, 83, 85, 87, respectively, and the length of each of the chamfered surfaces 81, 83, 85, 87 in the tire circumferential direction is preferably from 5 to 50% of the length of the interval between a corresponding one of pairs of the sipes 51, 53, 55, 57, each of the pairs being adjacent in the tire circumferential direction. The chamfered surfaces 81, 83, 85, 87 that are longer in the tire circumferential direction than this percentage are likely to degrade noise performance due to an increase in the groove volume, and may have an adverse effect on wet performance due to a decrease in the rigidity of the land portions. Further, the chamfered surfaces 81, 83, 85, 87 that are smaller in the tire circumferential direction than this percentage lessen the effect of improving wet performance.

According to an embodiment, the ratio of the length of each of the chamfered surfaces 81, 83, 85, 87 in the tire width direction to the length thereof in the tire circumferential direction is preferably larger than 1, and 10 or less, and more preferably 1.5 or more and 8 or less.

According to an embodiment, the length in the tire circumferential direction of the first chamfered surface 81 and the length in the tire circumferential direction of the third chamfered surface 83 are preferably mutually different. Further, according to an embodiment, the lengths of the second chamfered surfaces 87, 85 in the tire circumferential direction are preferably mutually different. These embodiments can yield the effect of improving wet performance by the chamfered surfaces 81, 87, which are longer in the tire circumferential direction and have edge components having an effect on a lateral force, and the effect of improving noise performance by the chamfered surfaces 83, 85, which are shorter in the tire circumferential direction and reduce groove volume. The length in the tire circumferential direction of the chamfered surface having the longest length in the tire circumferential direction, of the chamfered surfaces having different lengths in the tire circumferential direction, is preferably from 1.2 to 3 times, and more preferably from 1.5 to 2 times, the length in the tire circumferential direction of the chamfered surface having the shortest length in the tire circumferential direction.

According to an embodiment, the length in the tire circumferential direction of the first chamfered surface 81, which is farther from the tire centerline Cl, than the third chamfered surface 83, is preferably greater than the length in the tire circumferential direction of the third chamfered surface 83, which is closer to the tire centerline CL than the first chamfered surface 81. Further, according to an embodiment, the length in the tire circumferential direction of the second chamfered surface 87, which is farther from the tire centerline CL than the second chamfered surface 85, is preferably greater than the length in the tire circumferential direction of the second chamfered surface 85, which is closer to the tire centerline CL than the second chamfered surface 87. In these embodiments, the effect of improving wet performance is larger in a region farther from the tire centerline CL, and the effect of improving noise performance is larger in a region at or near the tire centerline CL, and thus noise performance improves, and the effect of suppressing a decrease in wet performance can be effectively obtained.

According to an embodiment, the ranges in the tire circumferential direction where the first chamfered surface 81 and the third chamfered surface 83 are located preferably do not overlap each other. According to another embodiment, the ranges in the tire circumferential direction where the second chamfered surfaces 85, 87 are located preferably do not overlap each other. According to yet another embodiment, the ranges in the tire circumferential direction where the chamfered surfaces 81, 83, 85, 87 are located preferably do not overlap each other. Thus, the chamfered surfaces 81, 83, 85, 87 are dispersed in the tire circumferential direction, and the effects of each of the chamfered surfaces 81, 83, 85, 87 on noise performance can be dispersed.

Figure 4:
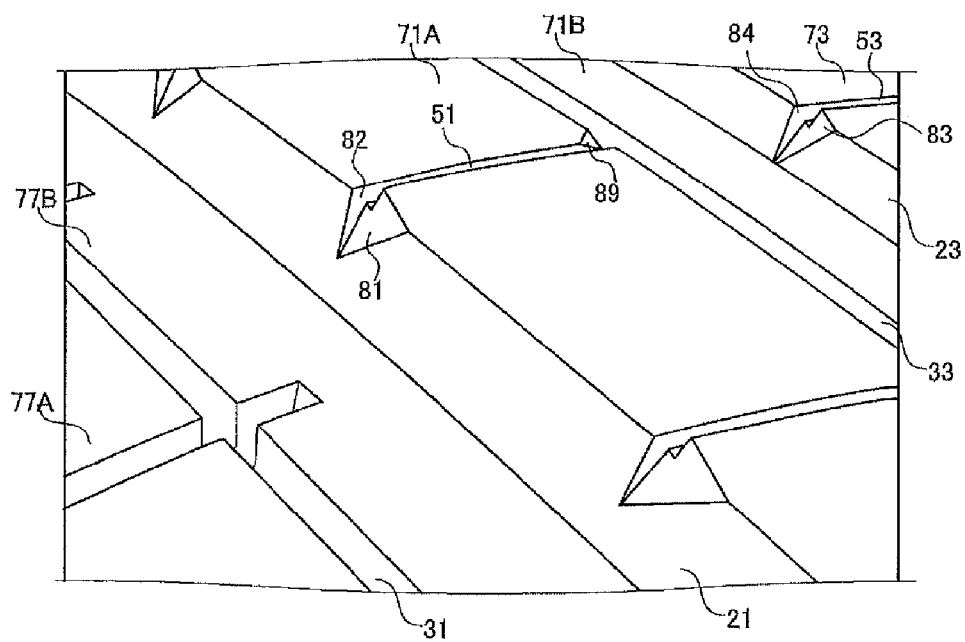
FIG. 4 is a perspective view illustrating an embodiment of a chamfered portion.

According to an embodiment, the maximum depths of the chamfered surfaces 81, 83, 85, 87 are preferably greater than the depths (maximum depths) of the Sipes 51, 53, 55, 57, respectively, which open to the chamfered surfaces 81, 83, 85, 87, respectively. The chamfered surfaces 81, 83, 85, 87 are inclined toward the main grooves 21, 23, 25, 27, respectively, and are deepest at the groove walls of the main grooves 21, 23, 25, 27, respectively. FIG. 3 illustrates a maximum depth D81 of the chamfered surface 81. FIG. 3 is a diagram illustrating a cross-section of a region between the first outer main groove 21 and the narrow groove 33. The maximum depths of the chamfered surfaces 81, 83, 85, 87 are thus greater than the depths of the sipes 51, 53, 55, 57, respectively, and the sipes 51, 53, 55, 57, as illustrated in FIG. 4, do not reach the groove walls of the main grooves 21, 23, 25, 27, respectively, open to the chamfered surfaces 81, 83, 85, 87, respectively, and close within the chamfered surfaces 81, 83, 85, 87, respectively. That is, the sipes 51, 53, 55, 57, though not connected (directly open) to the main grooves 21, 23, 25, 27, respectively, are open to the chamfered surfaces 81, 83, 85, 87, respectively, as described above, and are thus in communication with the main grooves 21, 23, 25, 27, respectively. FIG. 4 illustrates an embodiment of the chamfered surfaces 81, 83 as representing the chamfered surfaces 81, 83, 85, 87. In an embodiment in which the sipes 51, 53, 55, 57 are not connected to the main grooves 21, 23, 25, 27, respectively, in contrast to an embodiment in which the sipes 51, 53, 55, 57 are connected to the main grooves 21, 23, 25, 27, respectively, too much deformation of the land portion due to a decrease in rigidity is suppressed, and an appropriate rigidity of the land portions is obtained. Such an embodiment contributes to improving wet performance.

According to an embodiment, the maximum depths of the chamfered surfaces 81, 83, 85, 87 are preferably equal to each other.

According to an embodiment, a tire circumferential direction side where the first chamfered surface 81 is located with respect to the first sipe 51 (second side in FIG. 2) is preferably the same side as a tire circumferential direction side where the third chamfered surface 83 is located with respect to the third sipe 53 (second side in FIG. 2). Further, according to an embodiment, a tire circumferential direction side where the second chamfered surface 85 is located with respect to the second sipe 55 (second side in FIG. 2) is preferably opposite a tire circumferential direction side where the second chamfered surface 87 is located with respect to the second sipe 57 (first side in FIG. 2).

According to an embodiment, as illustrated in FIG. 4, the chamfered surfaces 81, 83, 85, 87 preferably each have a substantially triangular shape that decreases in length in the tire width direction from one side in the tire circumferential direction to the other side. This can minimize the effect of the chamfered surfaces 81, 83, 85, 87 on noise performance. The apexes of the triangle of the substantially triangular shape are located in the groove wall of the main groove, on the ground contact surface of the land portion in contact with the groove wall, and at the boundary between the ground contact surface and the groove wall.

According to an embodiment, each of the sipes 51, 53, 55, 57 preferably opens to a portion of a corresponding one of the chamfered surfaces 81, 83, 85, 87, the portion being where the chamfered surface is longest in the tire width direction (a portion that forms an apex of a substantially triangular shape in FIG. 4).

According to an embodiment, each of the sipes 51, 53, 55, 57 preferably has a raised bottom portion (main groove side communicating portion) at an opening end portion thereof that opens to a corresponding one of the chamfered surfaces 81, 83, 85, 87, the raised bottom portion being shallower than the maximum depth of a corresponding one of the sipes 51, 53, 55, 57. An embodiment in which the sipes 51, 53, 55, 57 are not connected to the main grooves 21, 23, 25, 27 increases the effect of obtaining the appropriate rigidity of the land portions.

According to an embodiment, as illustrated in FIG. 4, the tread pattern includes, in the land portion of each of the first middle region 71, the center region 73, and the second middle region 75, a wall surface of the land portion adjacent to a corresponding one of the chamfered surfaces 81, 83, 85, 87. The wall surface of the land portion is provided from an opening end portion of a corresponding one of the sipes 51, 53, 55, 57, to which the chamfered surfaces 81, 83, 85, 87 are inclined respectively, to the wall surface of a corresponding one of the main grooves 21, 23, 25, 27 and continuously extends from the wall surface of a corresponding one of the sipes 51, 53, 55, 57. FIG. 4 illustrates wall surfaces 82, 84 as representing the wall surface. The wall surfaces preferably each extend without being inclined with respect to the tire radial direction. This reduces groove volume and contributes to improving noise performance, compared to an embodiment in which the wall surfaces are inclined with respect to the tire radial direction. This also improves the effect of cutting water film and contributes to improving wet performance, compared to an embodiment in which the wall surfaces are inclined with respect to the tire radial direction.

According to an embodiment, the wall surface preferably extends along the extension direction of each of the sipes 51, 53, 55, 57, which open to the chamfered surfaces 81, 83, 85, 87, respectively. In an embodiment in which the wall surfaces extend away from the chamfered surfaces 81, 83, 85, 87 with respect to the extension directions of the sipes 51, 53, 55, 57, respectively (such that the inclination angles with respect to the tire width direction increase), edge components that have an effect on a lateral force may decrease, and the effect of suppressing a decrease in wet performance may decrease.

According to an embodiment, the inclination angles of the sipes 51, 53, 55, 57 with respect to the tire width direction are preferably 45 degrees or less. The edge components that have an effect on a lateral force are ensured by the chamfered surfaces 81, 83, 85, 87, and the edge effect can be enhanced with respect to a force in a front-rear direction by reducing the inclination angles of the sipes 51, 53, 55, 57. The inclination angles are preferably from 10 to 35 degrees.

According to an embodiment, the tread pattern preferably further includes a chamfered surface 89 where the tread surface is inclined toward the narrow groove 33 at an end portion in the tire width direction on a narrow groove 33 side of the region 71A including the first sipes 51, the region 71A being one of two regions divided by the narrow groove 33 in the tire width direction in the first middle region 71. A plurality of the chamfered surfaces 89 are provided in the tire circumferential direction, and are each connected to the sipe wall surface of the first sipe 51 at a connection end portion with the narrow groove 33. According to an embodiment, the maximum depth of the chamfered surface 89 is preferably smaller than the depth of the first sipe 51.

According to an embodiment, the length of the chamfered surface 89 in the tire circumferential direction is preferably shorter than the lengths of the chamfered surfaces 81, 83, 85, 87 in the tire circumferential direction.

According to an embodiment, the chamfered surface 81 and the chamfered surface 89 are preferably located on opposite sides of the first sipe 51 in the tire circumferential direction (second side and first side in FIG. 2).

Extension Line

Figure 5:
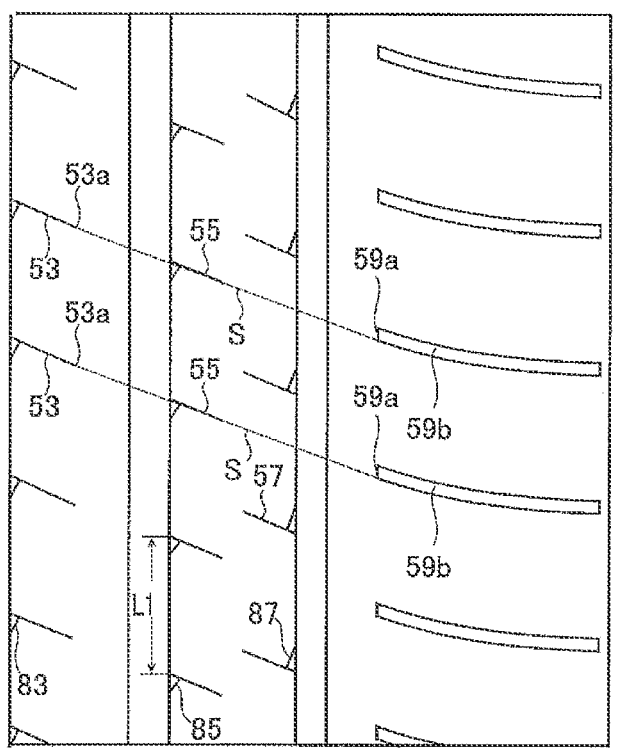
FIG. 5 is a diagram explaining an extension line.

According to an embodiment, as in the example illustrated in FIG. 5, the second sipes 55 preferably overlap each of a plurality of extension lines S. The second sipe 57 extends between two extension lines S adjacent in the tire circumferential direction, of the plurality of extension lines S, in a direction along the extension lines S. FIG. 5 is a diagram explaining the extension lines S. and illustrates two of the extension lines S in dashed lines.

The extension lines S are imaginary lines extending a plurality of the shoulder lug grooves 59 from the closed ends 59a of the plurality of the shoulder lug grooves 59 smoothly along an inclination direction of the main groove side portions 59h toward closed ends 53a of a plurality of the third sipes 53. The main groove side portion 59b is a portion of the shoulder lug groove 59 on a main groove 27 side, the portion including the closed end 59a. The extension line S is a straight line, "Extending smoothly" means that, of angles formed at the closed end 59a of the shoulder lug groove 59 between an inclination direction of the shoulder lug groove 59 with respect to the tire width direction and an extension direction of the extension line 5, a smaller one is 10 degrees or less, and preferably 5 degrees or less, Of angles formed at the closed end 53a of the third sipe 53 between an inclination direction of the third sipe 53 and an inclination direction of the extension line S, a smaller one is preferably 10 degrees or less, and more preferably 5 degrees or less. Still more preferably, the two directions are the same.

That "second sipes 55 overlap the extension lines S" includes not only an embodiment in which the second sipes 55 each contact or intersect the extension line S but also an embodiment in which the second sipes 55 each contact or intersect a region twice as distant from the extension line S in a direction orthogonal to the extension line S as the groove width of the main groove side portion 59b of the shoulder lug groove 59. Further, that "second sipe 57 extends in a direction along the extension lines S" means that an inclination angle of the extension direction of the second sipe 57 with respect to the extension lines S is 10 degrees or less, preferably 5 degrees or less, and more preferably 0 degrees.

Thus, the shoulder lug groove 59, the second sipe 55, and the third sipe 53 overlap the extension line S inclined with respect to the tire width direction, and so the shoulder lug groove 59, the second chamfered surface 87, and the second chamfered surface 85 are easily dispersed in the tire circumferential direction, contributing to improving noise performance.

On the other hand, the second sipe 57 is disposed closer to the shoulder lug groove 59 than the third sipe 53 and the second sipe 55, Accordingly, the second sipe 57 is disposed between two extension lines S adjacent in the tire circumferential direction, extending along the extension lines S, and thus does not overlap the extension lines S. Since the shoulder lug groove 59 has a large groove volume and generates a loud popping sound, the second sipe 57 and the shoulder lug groove 59 are preferably separated from each other in the tire circumferential direction.

According to an embodiment, preferably, each of all the shoulder lug grooves 59 and the third sipes 53 forms an end in the extension direction of one of the plurality of extension lines 5, and each of all the second sipes 55 overlaps one of the extension lines 5, and each of all the second sipes 57 extends between one of pairs of the extension lines S adjacent in the tire circumferential direction. Accordingly, an effect of dispersing the second chamfered surface 85, the second chamfered surface 87, and the shoulder lug groove 59 at mutually different locations in the tire circumferential direction is obtained across an entire circumference in the tire circumferential direction, and an effect of improving noise performance increases.

Further, according to an embodiment, the range of the second chamfered surface 85 along the tire circumferential direction preferably does not overlap the range of the shoulder lug groove 59 along the tire circumferential direction. The second chamfered surface 85 and the shoulder lug groove 59 being disposed at mutually different locations in the tire circumferential direction contributes to improving noise performance.

According to an embodiment, ranges in the tire circumferential direction of the extension lines S adjacent in the tire circumferential direction preferably do not overlap each other. An embodiment in which ranges of a couple of the extension lines S along the tire circumferential direction overlap each other is less likely to yield the effect of dispersing the chamfered surface 85, the second chamfered surface 87, and the shoulder lug groove 59 in the tire circumferential direction. Thus, the magnitude of the inclination angle of the extension line S with respect to the tire width direction is preferably from 10 to 30 degrees.

Further, according to an embodiment, the third sipe 53, the second sipe 55, and the second sipe 57 preferably have substantially equal inclination angles with respect to the tire width direction. "Substantially equal" refers to a difference in the inclination angle between the sipes being up to 10 degrees, and preferably up to 5 degrees.

According to an embodiment, the first sipe 51 preferably overlaps an imaginary straight line (second extension line) extending from a connection position of the third sipe 53 with the third inner main groove 23 to the outer side in the tire width direction (vehicle mounting inner side in FIG. 2) along the inclination direction of the third sipe 53 with respect to the tire width direction. That "first sipe 51 overlaps the second extension line" includes not only an embodiment in which the first sipe 51 contacts or intersects the second extension line but also an embodiment in which the first sipe 51 contacts or intersects a region located at a distance twice the groove width of the main groove side portion 58b of the shoulder lug groove 58, the distance being in a direction orthogonal to the second extension line from the second extension line.

In the tread pattern according to the example illustrated in FIG. 2, no lug grooves and sipes communicating with or connected to the narrow groove 33 or the first inner main groove 23 are provided in the region 71B between the narrow groove 33 and the first inner main groove 23, and a rib extending continuously in the tire circumferential direction is formed therein. Additionally, no sipes connected to the narrow groove 31 or the main groove 21 are provided in the region 77B, no lug grooves connected to the main groove 21 are provided in the region 77B, and a rib extending continuously in the tire circumferential direction is formed therein. Thus, in a region, disposed on a vehicle inner side, of the tread pattern, two narrow grooves 31, 33 form many edge components extending in the tire circumferential direction, and the rigidity of the two ribs is ensured. This increases steering stability by an inner ring during turning. Preferably, the length (width) of the region 77B in the tire width direction is greater than the width of the region 71B. The narrow groove 31 preferably has a wider groove width than the narrow groove 33.

The tread pattern of the present embodiment is not limited to the tread pattern according to the example illustrated in FIG. 2.

Comparative Examples and Examples

To examine effects of a tire of the present embodiment, the tread pattern of the tire was varied, and wet performance and noise performance were examined. The prototype tires each had a size of 225/65R17, and except for specifications indicated in Table 1 and below, were based on the tread pattern illustrated in FIG. 2 and the cross-section profile illustrated in FIGS. 1 and 3, and based the chamfered surfaces and wall surfaces on the embodiment illustrated in FIG. 4.

Table 1 indicates an embodiment related to the tread pattern of each of the tires and evaluation results thereof.

"71=75" of "Number of sipe intervals of regions 71, 75" in Table 1 means that the number of intervals G1 in the first middle region 71 and the number of intervals G2 in the second middle region 75 are equal, whereas "71<75" means that the number of intervals G2 is larger than the number of intervals G1.

In the "Arrangement configuration of second sipes 55, 57" row, "55 only" means that the second middle region 75 includes the second sipes 55 only and none of the second sipes 57, whereas "alternate" means that the second sipes 55 and the second sipes 57 are disposed alternately in the tire circumferential direction.

"Displacement amount of second sipe 57 relative to second sipe 55" indicates in percentage where the communicating position of the second sipe 57 with the second outer main groove is located in the interval L between the sipes 0.55 mutually adjacent, from the second sipe 55 adjacent to the second sipe 57 on the first side in the tire circumferential direction toward the second side.

"Longitudinal/lateral lengths of chamfered surfaces 81, 83, 85, 87" indicates a size relationship between the tire circumferential direction (longitudinal) length and the tire width direction (lateral) length of each of the chamfered surfaces 81, 83, 85, 87.

"Overlap of second sipe 55 and extension line" indicates whether the second sipe 55 overlaps the extension line S and the second sipe 57 extends between the extension lines S, with "overlapping" meaning an overlapping embodiment and "non-overlapping" meaning not such an embodiment.

Examples including Example 5 in which "Overlap of second sipe 55 and extension line is "non-overlapping" have the same configuration as Example 6 in FIG. 2 except that the second middle region was displaced in the tire circumferential direction with respect to the center region and the shoulder region such that the second sipe 55 did not overlap the extension line S and the second sipe 57 overlapped the extension line S.

Example 5 has the same configuration as Example 4 except that the chamfered surfaces 81, 83, 85, 87 are three times greater in length in the tire circumferential direction than in the tire width direction. Note that in examples including Example 4 in which in "Longitudinal/lateral lengths of chamfered surfaces 81, 83, 85, 87", "longitudinal=lateral", the lengths of the chamfered surfaces 81, 83, 85, 87 in the tire circumferential direction and in the tire width direction were each set to a length of 5% of the interval between a corresponding one of pairs of the sipes 51, 53, 55, 57 adjacent in the tire circumferential direction, the sipes 51, 53, 55, 57 opening to the chamfered surfaces 81, 83, 85, 87. In Comparative Examples and Examples, the maximum depths of the chamfered surfaces 81, 83, 85, 87 were deeper than the maximum depths of the sipes 51, 53, 55, 57 that opened to the chamfered surfaces 81, 83, 85, 87, respectively.

In Comparative Example 2 and Examples 1 to 3, the length of the first sipe 51 in the extension direction thereof was set to 80% of the length of the region 71A in the width direction.

Example 1 has the same configuration as Example 2 except that the second sipes 57 were omitted and that the same number of second sipes 55 as the number of second sipes 57 omitted were added.

In Comparative Example 2, the number of second sipes 55 was set to half that in Example 1. In Examples 1 to 6, the number of intervals G2 was set to twice the number of intervals G1.

Comparative Example 1 has the same configuration as Comparative Example 2 except that the sipes 51, 53, and 55 were replaced with lug grooves.

In Comparative Examples and Examples, the inclination angles, with respect to the tire width direction, of the lug grooves and sipes in the first middle region 71, the center region 73, and the second middle region 75 were set to from 20 to 30 degrees. Further, the magnitude of the inclination angle of the extension line S with respect to the tire width direction was set to from 20 to 30 degrees.

Each of these test tires was assembled on a vehicle such that the second half-tread region was disposed in a vehicle outer side of the first half-tread region, and evaluated for noise performance and wet performance as described below. The results of the evaluation are indicated in Tables 1 and 2. In the evaluation, each of the test tires was mounted on a wheel having a rim size of 17×7J, mounted on a front wheel drive vehicle of engine displacement of 2400 cc, and inflated to an air pressure of 230 kPa.

Noise Performance

Each test tire was measured for pass-by noise outside of a vehicle in accordance with the European noise regulation conditions (ECE R117). The evaluation results were expressed as index values by using reciprocals of measurement values, with Comparative Example 1 being assigned as the reference 100. Larger index values mean excellent noise performance.

Wet Performance

Running at a speed of from 40 to 100 km/hr was performed on a test course of an asphalt road surface sprayed with water having a depth of less than 1 mm, and a test driver performed sensory evaluation on steering characteristics when changing lanes and when cornering, and on stability when traveling straight. Wet performance is expressed as index values with Comparative Example 1 used as a tire according to the related art and assigned as the reference 100. Larger index values indicate excellent wet performance.

The allowable range of the index value of noise performance for each of the tires having the size of 225/65R17 was evaluated to be 103 or more, and that of the index value of wet performance for the same was evaluated to be 97 and more, and a case meeting these conditions was evaluated to have succeeded in suppressing a decrease in wet performance while improving noise performance.

second sipes 57 alternately in the tire circumferential direction improves wet performance.

A comparison between Example 2 and Example 3 reveals that in a configuration in which "Displacement amount of second sipe 57 relative to second sipe 55" is set to a value other than 50% and the intervals of the second sipes have a plurality of lengths, noise performance improves.

A comparison between Example 3 and Example 4 reveals that a configuration including the first sipes connected to the narrow groove 33 improves wet performance.

A comparison between Example 4 and Example 5 reveals that in a configuration in which the chamfered surfaces 81, 83, 85, 87 are greater in length in the tire circumferential direction than in the tire width direction, wet performance improves.

A comparison between Example 5 and Example 6 reveals that in a configuration in which the second sipe 55 overlaps

TABLE 1

|  | Comparative Example 1 | Comparative Example 2 | Example 1 | Example 2 |
|---|---|---|---|---|
| Lug groove or sipe | Lug groove | Sipe | Sipe | Sipe |
| Number of sipe intervals of regions 71, 75 | — | 71 = 75 | 71 < 75 | 71 < 75 |
| Arrangement configuration of second sipes 55, 57 | — | 55 only | 55 only | Alternate |
| Displacement amount (%) of second sipe 57 with respect to second sipe 55 | — | — | — | 50 |
| Presence of connection of first sipe 51 and narrow groove 33 | — | Non-connected | Non-connected | Non-connected |
| Longitudinal/lateral lengths of chamfered surfaces 81, 83, 85, 87 | Longitudinal = lateral | Longitudinal = lateral | Longitudinal = lateral | Longitudinal = lateral |
| Overlap of second sipe 55 and extension line | — | — | — | Non-overlapping |
| Noise performance | 100 | 110 | 108 | 108 |
| Wet performance | 100 | 95 | 98 | 102 |

|  | Example 3 | Example 4 | Example 5 | Example 6 |
|---|---|---|---|---|
| Lug groove or sipe | Sipe | Sipe | Sipe | Sipe |
| Number of sipe intervals of regions 71, 75 | 71 < 75 | 71 < 75 | 71 < 75 | 71 < 75 |
| Arrangement configuration of second sipes 55, 57 | Alternate | Alternate | Alternate | Alternate |
| Displacement amount (%) of second sipe 57 with respect to second sipe 55 | 95 | 95 | 95 | 95 |
| Presence of connection of first sipe 51 and narrow groove 33 | Non-connected | Connected | Connected | Connected |
| Longitudinal/lateral lengths of chamfered surfaces 81, 83, 85, 87 | Longitudinal = lateral | Longitudinal = lateral | Longitudinal > lateral | Longitudinal > lateral |
| Overlap of second sipe 55 and extension line | Non-overlapping | Non-overlapping | Non-overlapping | Overlapping |
| Noise performance | 110 | 110 | 108 | 110 |
| Wet performance | 103 | 105 | 107 | 109 |

A comparison between Comparative Example 1 and Example 1 reveals that a configuration including the first sipes and the second sipes, and more intervals of the first sipes than those of the second sipes can suppress a decrease in wet performance while improving noise performance.

A comparison between Comparative Example 2 and Example 1 reveals that a configuration including more intervals of the second sipes than those of the first sipes improves wet performance.

A comparison between Example 1 and Example 2 reveals that a configuration including the second sipes 55 and the the extension line S and the second sipe 57 extends between the extension lines 5, noise performance improves.

Although the tire according to an embodiment of the present technology has been described above in detail, the tire according to an embodiment of the present technology is not limited to the embodiments or examples that have been described above, and may of course be enhanced or modified in various ways without departing from the scope of the present technology.

The invention claimed is:

1. A tire comprising a tread pattern on a surface of a tread portion that contacts a road surface,
the tread pattern comprising:
a pair of first circumferential main grooves provided in a first half-tread region on one side of a tire centerline in a tire width direction, extending in a tire circumferential direction, and disposed at intervals from each other in the tire width direction;
a pair of second circumferential main grooves provided in a second half-tread region on an other side in the tire width direction, extending in the tire circumferential direction, and disposed at intervals from each other in the tire width direction;
a plurality of first sipes provided in a first region between the first circumferential main grooves, communicating with one of the first circumferential main grooves, extending in the tire width direction, and closing within the first region;
a circumferential narrow groove having a groove width smaller than a groove width of the first circumferential main grooves and extending in the tire circumferential direction within the first region; and
a plurality of second sipes provided in a second region between the second circumferential main grooves, communicating with one or an other of the second circumferential main grooves, extending in the tire width direction, and closing within the second region, and
a number of intervals of the second sipes adjacent in the tire circumferential direction being larger than a number of intervals of the first sipes adjacent in the tire circumferential direction; wherein
each sipe of the plurality of first sipes and the plurality of second sipes has a sipe width in a range of from 0.3 mm to 1.0 mm, and
the second sipes comprise a second sipe A and a second sipe B, the second sipe A communicating with one of the second circumferential main grooves and the second sipe B communicating with an other of the second circumferential main grooves at a location, in the tire circumferential direction, which is different from a location, in the tire circumferential direction, where the second sipe A communicates with the one of the second circumferential main grooves.

2. The tire according to claim 1, wherein the tread pattern does not comprise lug grooves that are provided in the first region, communicate with either of the first circumferential main grooves, and extend in the tire width direction, or lug grooves that are provided in the second region, communicate with either of the second circumferential main grooves, and extend in the tire width direction.

3. The tire according to claim 1, wherein
a plurality of the second sipes A and a plurality of the second sipes B are disposed at intervals in the tire circumferential direction, and
the second sipes B are disposed one by one between the second sipes A adjacent in the tire circumferential direction.

4. The tire according to claim 1, wherein a direction connecting two ends of an extension direction of the second sipe A and a direction connecting two ends of an extension direction of the second sipe B are inclined, with respect to the tire width direction, to a same side in the tire circumferential direction.

5. The tire according to claim 1, wherein lengths of the intervals of the second sipes differ between intervals of the second sipes which are adjacent in the tire circumferential direction.

6. The tire according to claim 1, wherein the first sipes communicate with the circumferential narrow groove.

7. The tire according to claim 6, wherein
a sipe depth of a narrow groove side connection portion of the first sipes is smaller than a groove depth of the circumferential narrow groove, the narrow groove side connection portion connecting to the circumferential narrow groove, and
a sipe depth of an intermediate portion of the first sipes is deeper than the groove depth of the circumferential narrow groove, the intermediate portion being located between the one of the first circumferential main grooves, with which the first sipes communicate, and the narrow groove side connection portion.

8. The tire according to claim 6, wherein a sipe depth of a main groove side communicating portion of the first sipes is smaller than a groove depth of the one of the first circumferential main grooves, the main groove side communicating portion communicating with the one of the first circumferential main grooves.

9. The tire according to claim 1, wherein the first sipes extend in a curved shape bulging to one side in the tire circumferential direction on a tread surface.

10. The tire according to claim 9, wherein a length of the first sipes in an extension direction of the first sipes is greater than a length of the second sipes in an extension direction of the second sipes.

11. The tire according to claim 1, wherein
the second sipes extend in a straight line, and
an inclination angle, with respect to the tire width direction, of a direction connecting two ends of an extension direction of the second sipes differs between adjacent second sipes which are adjacent in the tire circumferential direction.

12. The tire according to claim 1, wherein
the tread pattern comprises a plurality of third sipes that are provided in a third region between a first inner main groove of the first circumferential main grooves, closest to the tire centerline and a second inner main groove of the second circumferential main grooves, closest to the tire centerline, communicate with either the first inner main groove or the second inner main groove, extend in the tire width direction, and close within the third region, and
the number of the intervals of the second sipes is larger than a number of intervals of the third sipes adjacent in the tire circumferential direction.

13. The tire according to claim 12, wherein
a length of the second sipes in the tire width direction is half or less of a length of the second region in the tire width direction, and
a length of the third sipes in the tire width direction is half or less of a length of the third region in the tire width direction.

14. A tire comprising a tread pattern on a surface of a tread portion that contacts a road surface,
the tread pattern comprising:
a pair of first circumferential main grooves provided in a first half-tread region on one side of a tire centerline in a tire width direction, extending in a tire circumferential direction, and disposed at intervals from each other in the tire width direction;

a pair of second circumferential main grooves provided in a second half-tread region on an other side in the tire width direction, extending in the tire circumferential direction, and disposed at intervals from each other in the tire width direction;

a plurality of first sipes provided in a first region between the first circumferential main grooves, communicating with one of the first circumferential main grooves, extending in the tire width direction, and closing within the first region;

a circumferential narrow groove having a groove width smaller than a groove width of either of the first circumferential main grooves and extending in the tire circumferential direction within the first region; and a plurality of second sipes provided in a second region between the second circumferential main grooves, communicating with one or an other of the second circumferential main grooves, extending in the tire width direction, and closing within the second region, and a number of intervals of the second sipes adjacent in the tire circumferential direction being larger than a number of intervals of the first sipes adjacent in the tire circumferential direction; wherein each sipe of the plurality of first sipes and the plurality of second sipes has a sipe width in a range of from 0.3 mm to 1.0 mm, and the first sipes communicate with the circumferential narrow groove.

* * * * *